United States Patent [19]

Patton

[11] 4,124,953
[45] Nov. 14, 1978

[54] PLANTER KIT AND DISPLAY PACKAGE THEREFOR

[76] Inventor: Harold Y. Patton, 2606 Madison Rd., Cincinnati, Ohio 45208

[21] Appl. No.: 747,010

[22] Filed: Dec. 2, 1976

[51] Int. Cl.² ............................................. A01G 9/02
[52] U.S. Cl. ........................................... 47/66; 47/73; 47/84; 206/462; 206/515
[58] Field of Search ................... 47/17, 66, 69, 73, 84, 47/86, 14, 29; 206/461, 462, 463, 464, 465, 466, 515; 220/212; 426/108, 110, 111

[56] References Cited

U.S. PATENT DOCUMENTS

| | | | |
|---|---|---|---|
| 1,959,510 | 5/1934 | Van Wavern | 47/84 |
| 2,720,725 | 10/1955 | Peerless | 47/17 X |
| 3,032,927 | 5/1962 | Kobs | 47/73 |
| 3,078,985 | 2/1963 | Robinson | 47/66 X |
| 3,082,575 | 3/1963 | Schulz | 47/73 |
| 3,178,019 | 4/1965 | Fetzek | 206/465 |
| 3,375,607 | 4/1968 | Melvold | 47/86 X |
| 3,721,339 | 3/1973 | Seyer | 206/463 X |
| 3,961,444 | 6/1976 | Skaife | 47/84 |
| 4,007,285 | 2/1977 | Maier et al. | 206/515 X |

FOREIGN PATENT DOCUMENTS

| | | | |
|---|---|---|---|
| 717,364 | 9/1965 | Canada | 206/462 |
| 776,512 | 1/1968 | Canada | 206/462 |
| 2,017,100 | 10/1970 | Fed. Rep. of Germany | 47/86 |
| 1,467,810 | 2/1967 | France | 206/515 |
| 693,069 | 6/1953 | United Kingdom | 47/73 |
| 1,162,439 | 8/1969 | United Kingdom | 47/66 |

Primary Examiner—Edgar S. Burr
Assistant Examiner—Steven A. Bratlie
Attorney, Agent, or Firm—Wood, Herron & Evans

[57] ABSTRACT

A planter kit having component parts for assembly into a planter including a container, a transparent cover nesting in the container, and a dry, compresssed growing medium constrained between the container and the nesting cover. The planter kit is mounted in a cardboard package which is folded upon itself to form a pair of matching planar leaves and which has a through opening in at least one of the leaves of a size such that the container bottom and side projection through the opening with the rims of the container and nesting cover being matted between the leaves. A planter kit and package assembly is thus provided which maintains the nesting relation of the individual planter components during storing and shipping and which provides a space-saving display for the sale of the planter kit.

1 Claim, 5 Drawing Figures

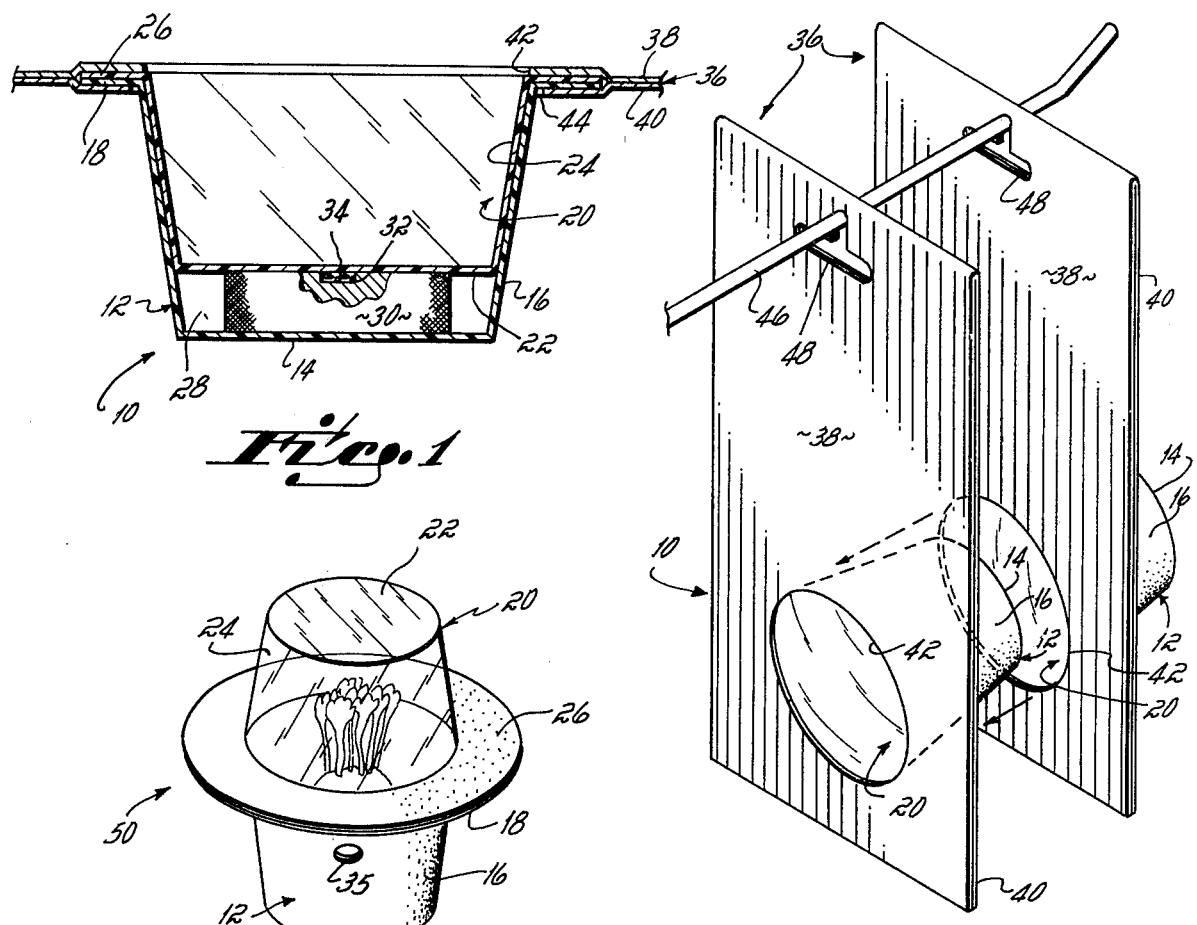
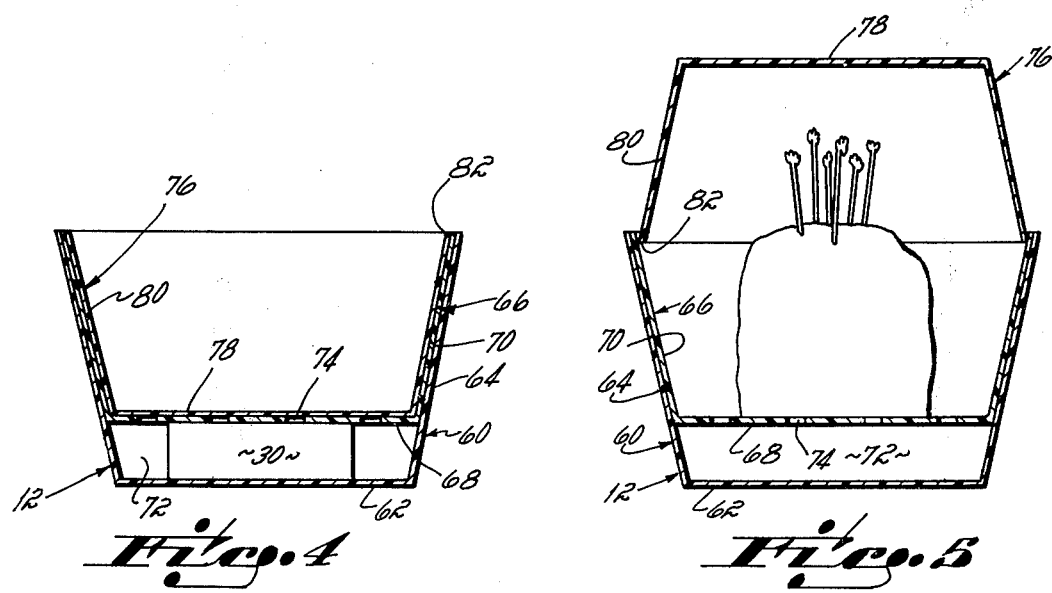

PLANTER KIT AND DISPLAY PACKAGE THEREFOR

BACKGROUND OF THE INVENTION

This invention relates to a planter for the germination of seeds. More particularly, this invention relates to a planter kit containing within itself a container, transparent cover, and growing medium for the germination of seeds; and a display package therefor.

It has been found in the sale of seeds to be germinated indoors by household consumers that it is highly attractive to consumers to provide not only the seeds but also a complete planter kit including container, growing medium, plant nutrients and cover which are assembleable by the consumer to form an enclosed planter for the germination of seeds. This is particularly true in specialty situations wherein a relatively small number of specialty plant seeds are sold to consumers in stores which would not normally stock seeds, containers, growing medium, etc. as individual items. One example would be the sale in a grocery store of seeds for growing herbs and spices in the home. Another example would be the sale in a pet store of seeds for growing a catnip plant in the home. In these specialty situations in particular, a self-contained planter kit including everything needed to germinate the seeds and grow the seedlings is highly attractive to consumers.

It has been an objective of this invention to provide a planter kit which contains all of the component parts needed to assemble into a covered planter for germinating seeds and wherein the individual components are nested to provide a compact arrangement for packaging, transporting, storing, and displaying of the planter kit to consumers.

It has been a further objective of this invention to provide a self-contained planter kit wherein the seeds to be germinated are included in the growing medium.

It has been a further objective of this invention to provide a planter kit which is relatively inexpensive to produce and is assembleable into a planter which is disposable by the consumer after germination of the seeds, the element of disposability being a further attraction to consumers.

Still further, it has been an objective of this invention to provide a planter kit and package assembly for improved mounting and display of the planter kit.

SUMMARY OF THE INVENTION

In one preferred form of the invention, the planter kit includes a container having a base, a side wall and a rim; a transparent cover nesting in the container with its rim resting on the rim of the container; and a dry, compressed growing medium interposed between the container and the cover. The cover has a depth somewhat less than the depth of the container thereby defining, when nested in the container, a space between the cover and the base of the container. The growing medium is disposed in this space and is snugly constrained between the adjacent bases of the container and the cover. When the planter is assembled by the consumer in the home, the cover is removed and inverted and is seated on the rim of the container to thereby enclose the growing medium, as a miniature germination chamber or "greenhouse."

The planter kit is mounted in a display package which, in one presently preferred form, is a single piece of cardboard which is folded upon itself to form two matching planar leaves and which has a through opening in at least one of the leaves of the size such that the container bottom and side project through the opening with the container rim and coterminus cover rim being matted between the leaves and supporting the planter kit in the display package. In another embodiment, the package is provided with a coincident through opening in the other leaf whereby the individual planter kit nested and package assemblies themselves are nestable in one another.

It is recognized that heretofore kits have been available including a container filled with loose vermiculite as a growing medium, and having a smilarly configured clear cap in which the container could be nested for shipment, and which can thereafter be inverted on the base as a cover. However, the growing medium was not water expansible and was granular. It occupied essentially the entire volume within the container, and was retained therein for shipment by a planar cover. Moreover, by reason of the granular nature of the growing medium, seeds cannot be retained at a given depth in such containers during shipment.

Other objectives and advantages of the invention will become apparent from the following detailed description, reference being had to the accompanying drawings.

BRIEF DESCRIPTION OF THE DRAWINGS

FIG. 1 is a cross-sectional view of the planter kit including a cross-sectional view of a portion of the display package in which the planter kit is mounted;

FIG. 2 is a perspective view of the planter kit and package assembly as mounted on a display rack;

FIG. 3 is a perspective view showing the planter as assembled; and

FIGS. 4 and 5 are cross-sectional views of another embodiment of the invention.

DETAILED DESCRIPTION OF THE INVENTION

Referring to FIGS. 1 and 2, the preferred form of the planter kit 10 comprises a generally hat-shaped container 12 having a generally planar base 14, a downwardly tapering side wall 16, and a flat annular rim 18; and a like, generally hat-shaped cover 20 having a generally planar bottom 22, a side wall 24, and an annular rim 26. The cover 20 is formed of transparent material, preferably a plastic, to allow for the entrance of light when the planter is assembled (FIG. 3). The container 12 may be either transparent or opaque but is preferably also formed of a plastic whereby the cover and container are relatively inexpensive and may be disposed of after use.

The cover 20 can nest in the container 12 with its rim 26 resting on the rim 18 of the container and is of a depth somewhat less than that of the container 12 whereby the bottom 22 of the cover is spaced from the base 14 of the container, defining a space 28 therebetween. A dry, compressed growing medium in the form of a pellet 30 is disposed in space 28. A suitable growing medium is a dry, compressed peat, containing fertilizer, which is sold under the trademark "Jiffy" by Jiffy Products Ltd. of Norway. This material is obtainable in the form of a pellet which when dry, by way of example, measures ⅜ inch in height and 1¾ inch in diameter. After soaking with water, however, the pellet swells to about 2 inches in height. The peat is surrounded by an expansible netting which holds the peat together after soaking and expansion. The container 12 is of a size such that on soaking of the pellet 30 with water, the expanded growing medium fills a substantial volume of the container. Another type of pellet which may be used employs soil binders to hold the peat together on soaking with water, rather than an expansible netting.

In the upper surface of the pellet 30 is a recess 32 in which seeds 34 are disposed. Although it will be recognized that the invention does not require the disposition of seeds in the growing medium, this is a preferred form. In this form of the invention, the bottom 22 of the cover contacts the upper surface of the pellet 30 and prevents the seeds 34 from falling out of the recess. The seeds may be further secured, if desired, to the surface of the pellet 30, by a thin, water soluble adhesive coating, which keeps the seeds from falling out of the recess. The disposition of the seeds in the recess prevents the seeds from being brushed off the surface of the pellet. If no recess is employed, the pellet may rest on inwardly extending dimples or pins (not shown) in the base 14 which lift the pellet 30 off the base with the seeds being adhesively secured to the under surface of the pellet 30. Thus the pellet is constrained between the bottom 22 of the cover and the dimples or pins in base 14 of the container with the seeds not being in contact with any surface which might cause their being brushed off. The container 12 may also include a hole 35 which limits the water level in the container.

The pellet 30 with the seeds 34 carried on it is somewhat fragile. In order to protect it from damage or bumping during shipment and prior to use, the space 28 receives and protects the pellet. This space is sized so that the pellet cannot shift or move easily in it, being confined between the adjacent base 14 and bottom 22. In the absence of the confining cone, the pellet could rattle inside the container and lose attractiveness for sale. The nesting of cover and base thus is not only convenient, but it also defines a compartment which is sized to receive and protect the fragile third component of the package.

Referring in addition to FIG. 2, the planter kit is mounted in a display package which comprises a single piece of planar material 36, for example, paper or cardboard, which is folded upon itself to form two leaves 38 and 40. The leaves 38 and 40 have through openings 42 and 44, respectively, which are of a diameter about that of the largest diameter of the side wall 16 of the container 12 but smaller than the outside diameter of the rims 18 and 26. Accordingly, the planter kit 10 may be inserted through the through opening 44 in leaf 40 from inside out of the package 36, i.e., from between the facing leaves 38 and 40, with the base 14 and side wall 16 of the container 12 projecting from the display package 36 but with the rims 18 and 26 lying between the leaves. The leaf 38 is then joined to leaf 40, for example, by gluing or stapling whereby the rims 18 and 26 of the planter kit 10 are matted between the two leaves to form a four-layer sandwich, as seen in cross-section in FIG. 1, which supports the planter kit 10 in the package 36. Display or advertising material may be printed on the exposed surface of the leaf 40 with instructions for use of the planter printed on the exposed surface of leaf 38, or back of the planter kit and package assembly.

It is, of course, not required to have the opening 42 in leaf 38 to mount planter kit 10 in the package 36. However, opening 42 provides for visibility through the back of the package whereby the consumer may look through the base 22 of the transparent cover 20 and view the protected, confined growing medium and the seeds resting in the recess in the pellet. This is particularly desirable when the container 12 is opaque. Furthermore, in this embodiment, the display packages themselves are nestable such that when the packages are hung from a wire rack, as shown in FIG. 2, wherein a plurality of packages are suspended on a horizontally projecting wire 46 which extends through openings 48 in the packages 36, the outwardly projecting container 12 nests in the recess in the adjacent cover 20. The planter kit and package assembly thus reduces the shelf space required to present a given number of the packages, in addition to providing an attractive display for consumers.

The planter kit 10 is assembleable into a planter 50 (FIG. 3) by first removing the kit 10 from the package 36 which is accomplished merely by separating the leaves 38 and 40 and sliding the planter out of the through opening 44. The transparent cover 20 is then removed from the container 12 permitting removal of the pellet 30. Water is then placed in the container to the desired level, which may be determined by the disposition of a hole 35 in the side of the container. The pellet 30 is then floated on the surface of the water, and absorbs the water thereby expanding to fill a substantial volume of the container. The cover 20 is then inverted and placed on the container with its rim 26 resting on the rim of the container 18 and being coterminus therewith. The bottom 22 on inversion is now, of course, the top of the planter 50. The cover and container thus form a miniature "hothouse" or "terrarium" or germination chamber which conserves moisture and is ideal for germination of the seeds. In some cases depending on the plant being grown, a totally saturated atmosphere within the germination chamber is needed for successful germination. The covered germination chamber thus is highly beneficial in the germination of these plants. The planter 50 is then placed in a windowsill or the like and the seeds are permitted to germinate. Following germination, when the seedlings 52 have grown near the top of the cover 20, the cover may be removed and inverted and the container seated therein as in a saucer. Thereafter, when the seedlings are about to outgrow the container, the growing medium with seedlings may be lifted out of the container and planted in a conventional pot. Since the roots are not disturbed, the seedlings are not subjected to transplant shock. The container and cover are then disposed of.

Referring now to FIGS. 4 and 5, in the embodiment of the invention therein illustrated, the container 12 comprises a generally cup-shaped outer member 60 having a base 62 and side wall 64 and a like inner member 66 having a base 68 and side wall 70. The inner member 66 nests in the outer member 60 defining a space 72 between the bases 62 and 68. The pellet 30 is disposed in the space 72 in the same manner as heretofore described such that the pellet 30 is constrained between the bases 62 and 68 of the outer and inner container members 60 and 66, respectively. The planter kit further includes a like cup-shaped transparent cover 76 having a base 78 and side wall 80 which nests in the inner container member 66. The planter kit is assembled by first removing the transparent cover 76 and inner container member 66 which permits removal of the pellet 30. The inner container member 66 is then re-nested in the outer container member 60. Water is then added to the inner container 66. Preferably, the inner container 66 is provided with a plurality of drain holes 74 in the base 68 which provide for drainage from the inner container into the space 72, in which case on initially filling the inner container 66 with water, the space 72 is likewise filled with water. The pellet 30 is then floated on the surface of the water and absorbs the water thereby expanding to fill a substantial volume of the inner container 66. The cover 76 is then inverted and placed on the container, as shown in FIG. 5, being supported by the side wall of the inner container member 66 about its rim 82 to form the enclosed germination chamber for germination of the seeds. On periodic watering of the seedlings, excess water drains through the drain holes 74 to prevent the roots from being drowned.

Although the invention has been described in terms of certain preferred embodiments, it will be recognized by those skilled in the art that other forms may be adopted within the scope of the invention.

Thus having described the invention, what is claimed is:

1. A planter kit and package assembly comprising the combination of a planter kit and a package,
    said planter kit including
        a container in the form of a a deep dish having a base, a side wall, and an annular rim projecting outwardly from said side wall;
        a cover also in the form of a deep dish having a bottom, a side wall, and an annular rim projecting outwardly from the side wall of said cover, said cover nesting in said container with said rim of said cover seated on said rim of said container, the depth of the cover being less than that of said container so that the bottom of said cover is spaced from said base of said container to provide a space therebetween, the side walls of said container and cover being tapered and in facial engagement, said cover being adapted to be inverted and its rim placed on the rim of said container to provide a germination chamber when said planter kit is assembled;
        and a water expansible growing medium in the form of a small, dry, compressed pellet which is received in said space between the bottom of the cover and the base of the container, said space being sized to constrain said pellet therein;
    said package comprising
        a single planar sheet folded upon itself to form overlying planar leaves, the leaves including through openings, the said openings being aligned with one another whereby a container of a second similar planter kit can be inserted through said openings and nested in the cover of the first described planter kit;
        said container and cover projecting through one of said openings with the said rims thereof being mated between said leaves,
    the said leaves secured together to trap the rims of the container and cover between them.

* * * * *